(12) United States Patent  (10) Patent No.: US 9,114,759 B1
Hudson et al.  (45) Date of Patent: Aug. 25, 2015

(54) CARRYING DEVICE AND RELATED METHODS

(71) Applicant: Rider's Caddy, Inc., Scottsdale, AZ (US)

(72) Inventors: Ross Hudson, Scottsdale, AZ (US); Valdean A. Johnson, Riverton, UT (US)

(73) Assignee: RIDER'S CADDY, INC., Scottsdale, AZ (US)

( * ) Notice: Subject to any disclaimer, the term of this patent is extended or adjusted under 35 U.S.C. 154(b) by 0 days.

(21) Appl. No.: 14/103,730

(22) Filed: Dec. 11, 2013

(51) Int. Cl.
| | | |
|---|---|---|
| *B62J 7/00* | (2006.01) | |
| *B62J 9/00* | (2006.01) | |
| *B62J 7/06* | (2006.01) | |
| *B62J 11/00* | (2006.01) | |
| *B60R 9/00* | (2006.01) | |
| *B60R 11/00* | (2006.01) | |
| *B60R 9/08* | (2006.01) | |

(52) U.S. Cl.
CPC ... *B60R 9/08* (2013.01); *B62J 11/00* (2013.01)

(58) Field of Classification Search
CPC .................................. B60R 9/06; B62J 11/00
USPC ......... 224/413, 419, 421, 433, 441, 442, 447, 224/526, 426
See application file for complete search history.

(56) References Cited

U.S. PATENT DOCUMENTS

| | | | | |
|---|---|---|---|---|
| 4,915,276 | A | * | 4/1990 | Devito ........................... 224/521 |
| 5,033,223 | A | * | 7/1991 | Minter ............................ 43/21.2 |
| 5,406,816 | A | * | 4/1995 | Thomas ........................ 62/457.1 |
| 5,536,130 | A | * | 7/1996 | Edensor ........................ 414/462 |
| 5,556,064 | A | * | 9/1996 | Cowe ............................ 248/172 |
| 5,727,642 | A | * | 3/1998 | Abbott ......................... 180/65.1 |
| 5,806,738 | A | | 9/1998 | D'Angelo |
| 6,039,227 | A | | 3/2000 | Stark |
| 6,062,053 | A | * | 5/2000 | Ho .................................. 70/233 |
| 6,305,702 | B1 | | 10/2001 | Alford, II |
| 6,427,854 | B1 | | 8/2002 | Grossi et al. |
| 6,478,203 | B2 | | 11/2002 | Burns |
| 6,494,352 | B1 | * | 12/2002 | Mullen ........................ 224/521 |
| 6,554,171 | B1 | * | 4/2003 | Ewing, III ..................... 224/521 |

(Continued)

OTHER PUBLICATIONS

Golf Bag Carrier for Motorcycles, www.pashnit.com/product/2x2/motorcycle_golf_rack.html, last accessed Dec. 10, 2013.

(Continued)

*Primary Examiner* — Brian D Nash
*Assistant Examiner* — Derek Battisti
(74) *Attorney, Agent, or Firm* — Adam R. Stephenson, Ltd.

(57) ABSTRACT

A carrying device for attachment to a vehicle includes a carrying section configured to receive the full diameter and at least more than half of the length of a golf bag, an opening at its upper extremity configured to allow the golf bag to enter the carrying section, and a plurality of sidewall openings configured to visually expose the golf bag through the sidewall openings more than to visually enclose the golf bag through the carrying section. The first vehicle coupler is configured to be coupled to a vehicle and includes a first receiver having a first substantially rectangular cuboidal cavity and a second receiver having a second substantially rectangular cuboidal cavity. A first connector couples the carrying section to the first vehicle coupler through the first substantially rectangular cuboidal cavity. A second connector couples the carrying section to the second vehicle coupler through the second substantially rectangular cuboidal cavity.

17 Claims, 10 Drawing Sheets

(56) References Cited

U.S. PATENT DOCUMENTS

| | | |
|---|---|---|
| 6,921,099 B2 | 7/2005 | Hoffmann |
| 6,938,806 B2 | 9/2005 | James |
| 7,487,895 B2 | 2/2009 | Hesmer |
| 7,832,608 B1 * | 11/2010 | Bauer, Jr. .................... 224/526 |
| D685,716 S * | 7/2013 | Castro ......................... D12/408 |
| 8,544,642 B1 * | 10/2013 | Lytle et al. ................. 206/315.4 |
| 2004/0173652 A1 | 9/2004 | Busta |
| 2005/0258207 A1 | 11/2005 | Sadler |
| 2007/0012739 A1 | 1/2007 | Geuss |
| 2007/0187448 A1 | 8/2007 | Dongiovanni et al. |
| 2008/0023511 A1 * | 1/2008 | King et al. .................... 224/419 |
| 2008/0169323 A1 * | 7/2008 | Deitrich ........................ 224/413 |
| 2010/0320725 A1 | 12/2010 | Thorpe, Sr. |
| 2011/0057007 A1 | 3/2011 | Conroy, Jr. |

OTHER PUBLICATIONS

Welcome to Bo-Go Caddy, http://www.gogocaddy.com/index.html, last accessed Dec. 10, 2013.

* cited by examiner

CARRYING DEVICE AND RELATED METHODS

BACKGROUND

1. Technical Field

Aspects of this document relate generally to carrying devices for attachment to vehicles. More specific implementations involve carrying devices for attachment to motorcycles.

2. Background Art

A carrying device configured for attachment to a vehicle generally includes an enclosure or container configured to receive one or more items for transportation purposes. To attach or couple the carrying device to the vehicle, one or more attachment mechanisms are generally included. Carrying devices may be configured for coupling to various portions of a vehicle. Some carrying devices have been configured for placement on top of a vehicle. Other carrying devices have been configured with wheels and incorporated into a standalone unit such as to be towed behind a vehicle. Carrying devices may be used to effectively increase the storage capacity of a vehicle or to allow a user to carry items that may not otherwise be carried with the vehicle alone.

SUMMARY

Implementations of a first vehicle coupler configured for attachment to a motorcycle may include: a first attachment member coupled to a base and having at least one bolt receiver; a second attachment member coupled to the base and having at least one bolt receiver; a first receiver coupled to the base and defining a first substantially rectangular cuboidal cavity, the first receiver having a first substantially rectangular opening providing access to the first substantially rectangular cuboidal cavity; and a second receiver coupled to the base and defining a second substantially rectangular cuboidal cavity, the second receiver having a second substantially rectangular opening providing access to the second substantially rectangular cuboidal cavity, wherein the first substantially rectangular cuboidal cavity and the second substantially rectangular cuboidal cavity have substantially equal dimensions.

Implementations of first vehicle couplers may include one, all, or any of the following:

The first substantially rectangular opening and second substantially rectangular opening may reside in substantially the same plane.

The at least one bolt receiver of the first attachment member may be included in a vertical section of the first attachment member that is substantially perpendicular to a largest planar surface of the base, and the at least one bolt receiver of the second attachment member may be included in a vertical section of the second attachment member that is substantially perpendicular to the largest planar surface of the base.

Each of the at least one bolt receiver of the first attachment member and second attachment member may include a recess forming a vertical slot.

The vertical section of the first attachment member and the vertical section of the second attachment member may be substantially parallel with, and substantially included in, the same plane.

The first receiver may include a first pin receiver and the second receiver may include a second pin receiver.

Implementations of a carrying device for attachment to a vehicle may include: at least one carrying section configured to receive the full diameter and at least more than half of the length of a golf bag, the at least one carrying section having an opening at its upper extremity configured to allow the golf bag to enter into the at least one carrying section, wherein the at least one carrying section includes a plurality of sidewall openings therethrough configured to visually expose the golf bag through the plurality of sidewall openings more than to visually enclose the golf bag through the at least one carrying section; a first vehicle coupler configured to be coupled to the vehicle, the first vehicle coupler further including a first receiver having a first substantially rectangular cuboidal cavity and a second receiver having a second substantially rectangular cuboidal cavity; a first connector coupled to the at least one carrying section, the first connector coupled to the first vehicle coupler through the first substantially rectangular cuboidal cavity of the first receiver, and; a second connector coupled to the at least one carrying section, the second connector coupled to the first vehicle coupler through the second substantially rectangular cuboidal cavity of the second receiver.

Implementations of first vehicle couplers may include one, all, or any of the following:

The first connector may include a third receiver having a third substantially rectangular cuboidal cavity and the second connector may include a fourth receiver having a fourth substantially rectangular cuboidal cavity, and wherein a first height adjuster couples to the first connector through the third substantially rectangular cuboidal cavity and couples to the first vehicle coupler through the first substantially rectangular cuboidal cavity, and wherein a second height adjuster couples to the second connector through the fourth substantially rectangular cuboidal cavity and couples to the first vehicle coupler through the second substantially rectangular cuboidal cavity.

The first vehicle coupler may include a first attachment member and a second attachment member, the first attachment member and the second attachment member each having at least one bolt receiver configured to allow the first vehicle coupler to be coupled to the vehicle.

The at least one carrying section may include a framework of vertical members and lateral members and at least one floor member coupled together and forming the plurality of sidewall openings.

An overall shape of the at least one carrying section may be cylindrical.

One or more hinges may be disposed along a longest length of the at least one carrying section and may be configured to allow the at least one carrying section to be opened along the longest length.

The at least one carrying section may include two carrying sections.

Each carrying section may include at least one hinge disposed along a longest length of the carrying section and configured to allow the carrying section to open along the longest length.

A restraint may be coupled to the carrying device and configured to restrain a movement of an item placed in the carrying device.

At least one height adjuster may be coupled between the first vehicle coupler and the at least one carrying section and may be configured to adjust a height of the at least one carrying section.

A second vehicle coupler may be coupled to the at least one carrying section and may be configured to couple to the vehicle.

The second vehicle coupler may include a pair of rigid arms coupled to the at least one carrying section through a pivot.

Implementations of a carrying device for attachment to a motorcycle may include: at least one carrying section configured to receive the full diameter and at least more than half of the length of a golf bag, the at least one carrying section having an opening at its upper extremity configured to allow the golf bag to enter the at least one carrying section, wherein the at least one carrying section includes a plurality of sidewall openings therethrough configured to visually expose the golf bag through the plurality of sidewall openings more than to visually enclose the golf bag through the at least one carrying section; and a second vehicle coupler coupled to the at least one carrying section and configured to couple to the motorcycle, wherein the second vehicle coupler includes a pair of rigid arms, the pair of rigid arms coupled to the at least one carrying section through a pivot to form a v-shaped structure.

Implementations of first vehicle couplers may include one, all, or any of the following:

The at least one carrying section may include a framework of vertical members and lateral members and at least one floor member coupled together and forming the plurality of sidewall openings.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended carrying devices and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such carrying devices and related methods, and implementing components and methods, consistent with the intended operation and methods.

Figure 1:
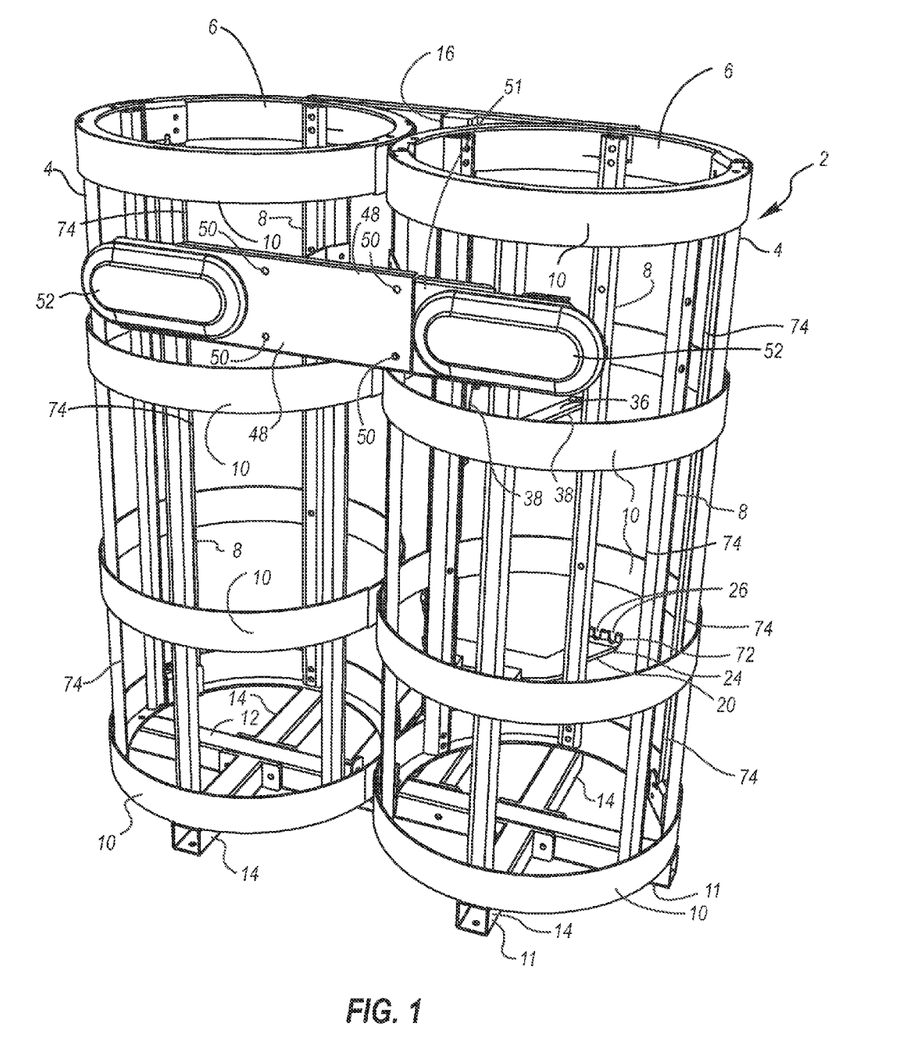
FIG. 1 is front perspective view of an implementation of a carrying device.
Figure 2:
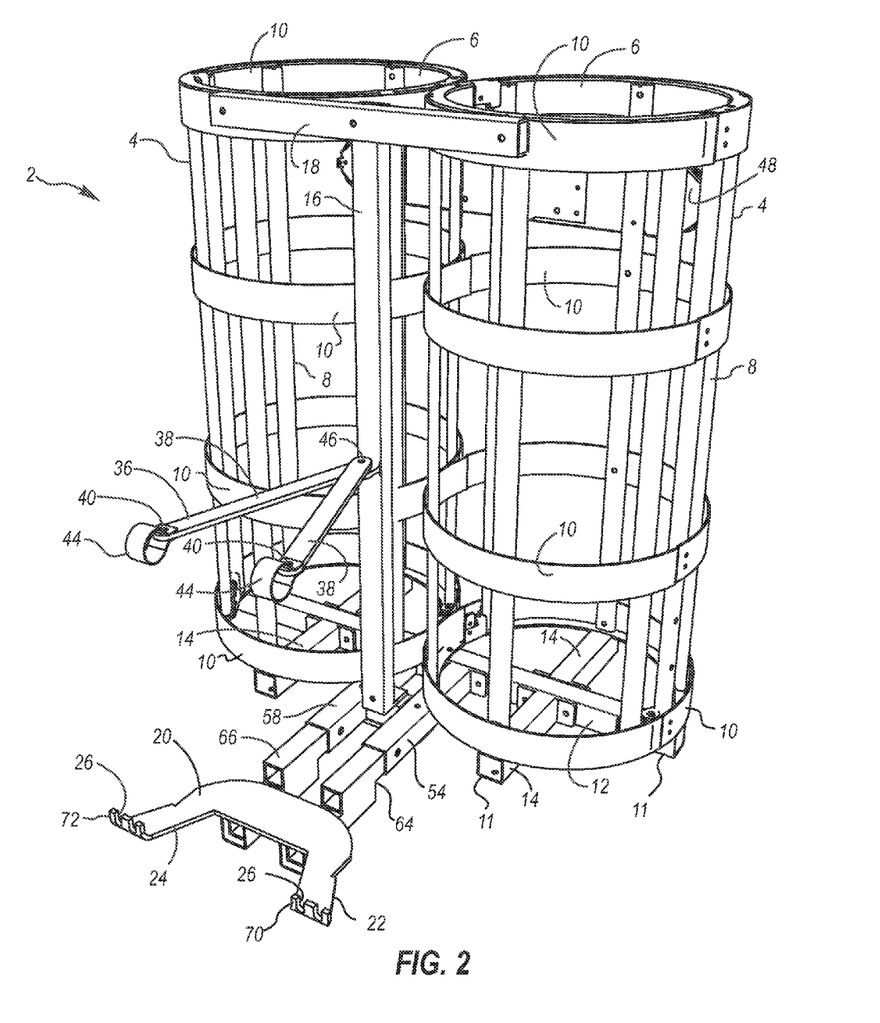
FIG. 2 is a rear perspective view of an implementation of a carrying device.

Referring now to FIGS. 1 and 2, in various implementations a carrying device 2 includes at least one carrying section 4. The implementation shown in FIG. 1 includes two carrying sections 4 side by side, in other implementations the carrying device 2 could include only a single carrying section 4, or three carrying sections 4, or four carrying sections 4, and so forth. In the implementation shown in FIG. 1 each carrying section 4 has a cylindrical shape, but in other implementations each carrying section 4 could have a different shape, such as: a cuboidal shape; an inverted cone or conical frustum; an inverted triangular, square or other polygon-based pyramid or pyramidal frustum; and the like.

In implementations each carrying section 4 includes an opening 6 for the admittance of one or more items into the carrying section 4. In the implementations shown each carrying section 4 is configured to carry, and the opening 6 is configured to receive, a golf bag. In other implementations each carrying section 4 could be configured to hold some other item, such as, by non-limiting example: separate golf clubs; other sports equipment such as balls and the like; one or more briefcases; one or more grocery bags and/or groceries and the like; yard equipment such as rakes, shovels and the like; and so forth. In short, each carrying section 4 could be configured to hold many different items. In implementations in which the carrying device 2 includes more than one carrying section 4, each carrying section 4 could be configured to hold a different type of item or each carrying section 4 could be configured to hold the same or a similarly shaped or sized item. In the implementations shown in the drawings each carrying section 4 is configured to carry a golf bag.

While the implementations shown only carrying sections 4 that have an opening 6 at the upper extremity of the carrying section 4 for receiving a golf bag, in implementations the carrying section 4 could omit the opening 6. By non-limiting example, referring to FIG. 7, in implementations a carrying section 4 could include a hinge 84, such as along its longest length, such that the carrying section 4 opens using the hinge 84 in order to receive the golf bag. In such implementations the carrying section 4 could be sized so that the top of the golf bag, when the golf bag is inside the carrying section 4, is lower than the upper extremity of the carrying section 4, such that the opening 6 is not required. In other implementations such a hinge 84 could be included but the carrying section 4 could be sized so that the golf bag, when placed inside the carrying section 4, extends upwards past the upper extremity of the carrying section 4, such that the opening 6 is still included so the golf bag can extend upwards through the opening 6 when the golf bag is being carried by the carrying section 4.

Various hinged versions of a carrying section 4 may be implemented. In implementations wherein a single carrying section 4 is used, one or more hinges 84 could be placed along a longest length of the carrying section 4 to allow the carrying section 4 to open along that longest length. In implementations the carrying section 4 could be configured to open along all, or along substantially all, the longest length. In other implementations the carrying section 4 could be configured to open along some, but not all, of the longest length. For example, referring to FIG. 1, in implementations an accessory mount 48 is included which can include openings 50 and/or other attachment mechanisms for the attachment of a license plate, lights 52 (such as brake lights that are configured to be in sync with the vehicle brake lights) and the like. In the various implementations shown the accessory mount 48 is located about in the middle of the back of the carrying device 2. In other implementations the accessory mount 48 could be located at or proximate the bottom of the carrying device 2 and each carrying section 4 could include one or more hinges 84 along its longest length that is configured to allow the carrying section 4 to open along some, but not all, of the longest length of the carrying section 4 (such as opening along all or substantially all of the longest length except the portion of the longest length whereon the accessory mount 48 is located).

Figure 7:
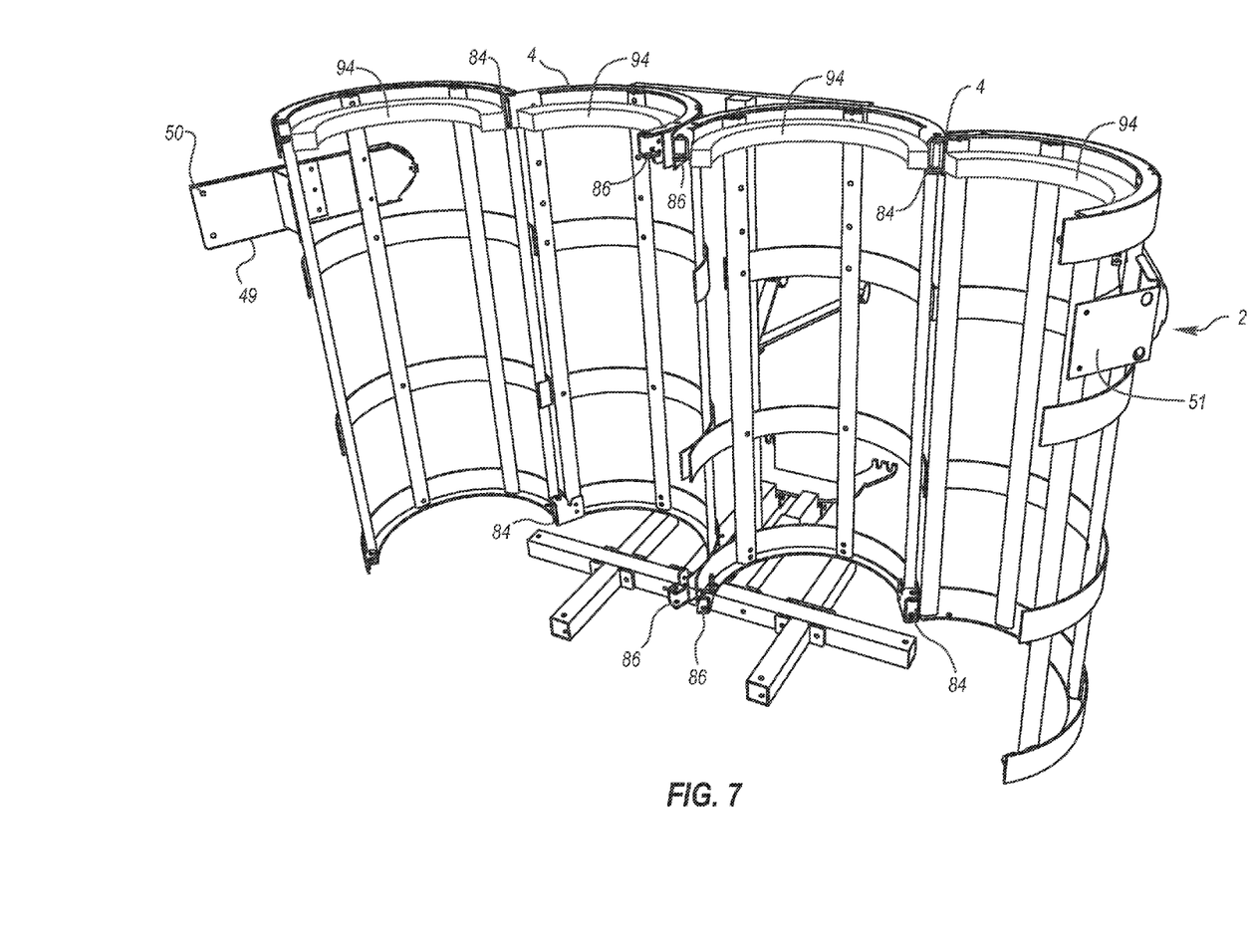
FIG. 7 is a front perspective view of an implementation of a carrying device in an open configuration.

In other implementations the accessory mount 48 could be located at or proximate the top of the carrying device 2 and one or more hinges 84 could similarly be designed so that the carrying sections 4 open below the accessory mount 48 and thus along some, but not all, of the longest length of the carrying section 4. In other implementations the accessory mount 48 could be split or otherwise severed so that each carrying section 4 may be configured with hinges 84 or the like to open along the entirety, or substantially the entirety, of its longest length, as shown in FIG. 7. In other implementations the accessory mount 48 could be configured so that a license plate and one light 52 are coupled to one carrying section 4 and a second light 52 is coupled to the other carrying section 4. In implementations a carrying device 2 having two carrying sections 4 could be configured such that a hinge 84 is placed only along a longest length of one of the carrying sections 4 and both carrying sections 4 are configured to open using this same hinge 84.

In implementations each carrying section 4 is configured with a plurality of sidewall openings 74 through which the golf bag or other item may be seen when placed inside the carrying section 4. In implementations more than half of the golf bag (or other item placed inside the carrying section 4) is visible through the plurality of sidewall openings 74. In implementations the carrying section 4 is thus more open than enclosed and/or the plurality of sidewall openings 74 are configured to visually expose the golf bag through the plurality of sidewall openings 74 more than the carrying section 4 is configured to visually enclose the golf bag. In implementations the carrying section 4 could be configured to entirely visually enclose the golf bag, such that the golf bag is not visible through the carrying section 4 when the golf bag is placed inside the carrying section 4. In other implementations the carrying section 4 could be configured with a plurality of sidewall openings 74 such that less than half of the golf bag is visible through the sidewall openings 74 when the golf bag is placed therein.

In implementations each carrying section 4 includes a framework of vertical members 8, lateral members 10 and floor members 11 coupled together. In implementations the framework is, as shown in the drawings, a skeletal framework, and the vertical members 8 and lateral members 10 form the sidewall openings 74. In implementations the vertical members 8, lateral members 10 and floor members 11 could be made into any shape and made of any material, such as polymer, metallic, ceramic or composite bars, rods, tubes, sheets, strips or the like. In implementations the floor members 11 include a main floor member 12 and a plurality of side floor members 14. In implementations each carrying section 4 could be have a framework that is shaped differently than that shown in the drawings. In implementations the entire sidewall and/or floor of a carrying section 4 could be, for instance, formed of a polymeric, composite, or ceramic material with sidewall openings 74 integrated therein.

Referring still to FIGS. 1 and 2, in implementations a lateral support 18 is coupled to the carrying section 4 and a vertical support 16 is coupled to the lateral support 18. The vertical support 16 in implementations is coupled to a first connector 54 and second connector 58 such as, by non-limiting example, through a bridge 62 that couples to both the first connector 54 and second connector 58. In implementations the first connector 54 and second connector 58 are each coupled to at least one of the floor members 11. In the implementations shown the first connector 54 and second connector 58 are each attached to the main floor member 12.

Figure 5:
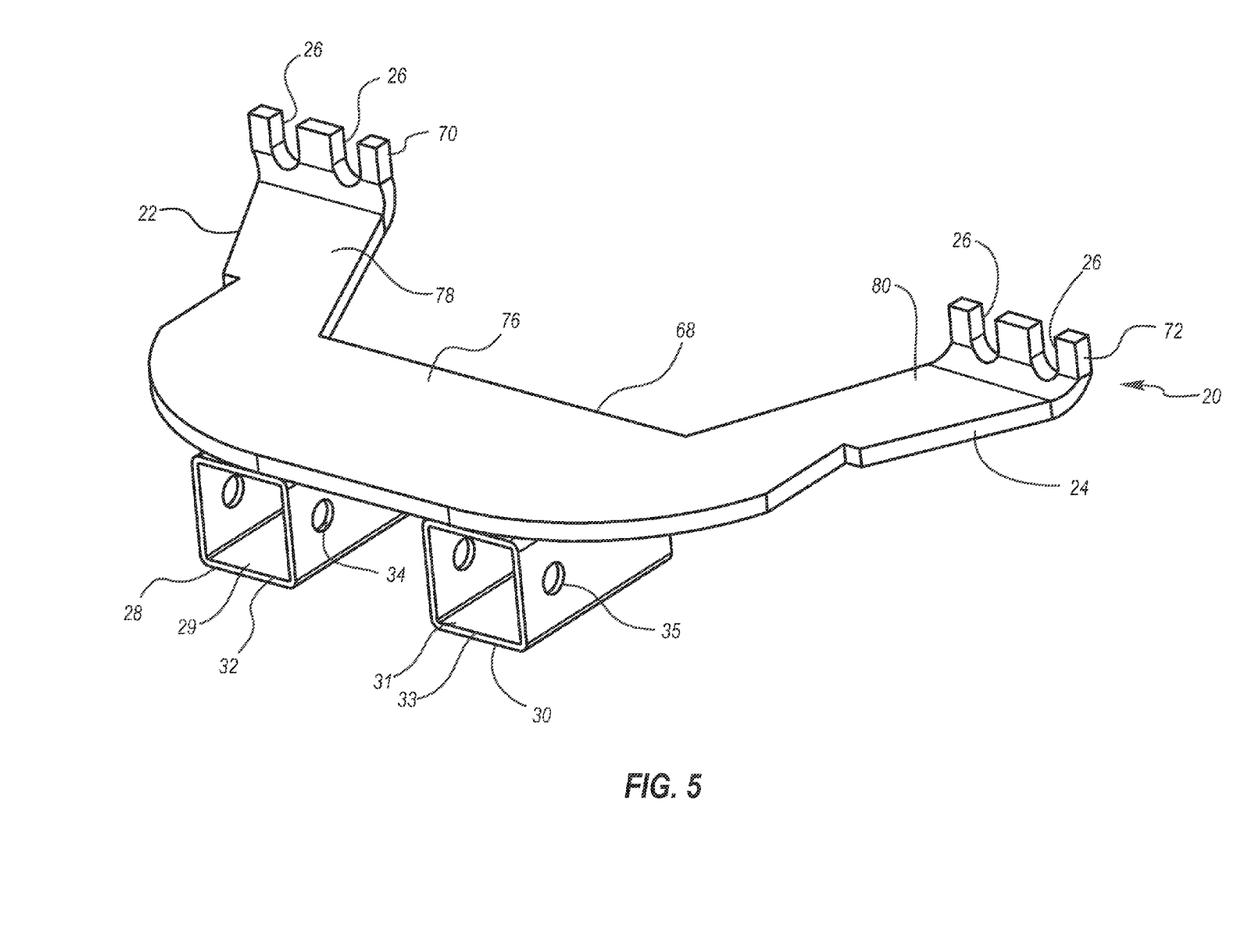
FIG. 5 is a top front perspective view of an implementation of a first vehicle coupler.
Figure 6:
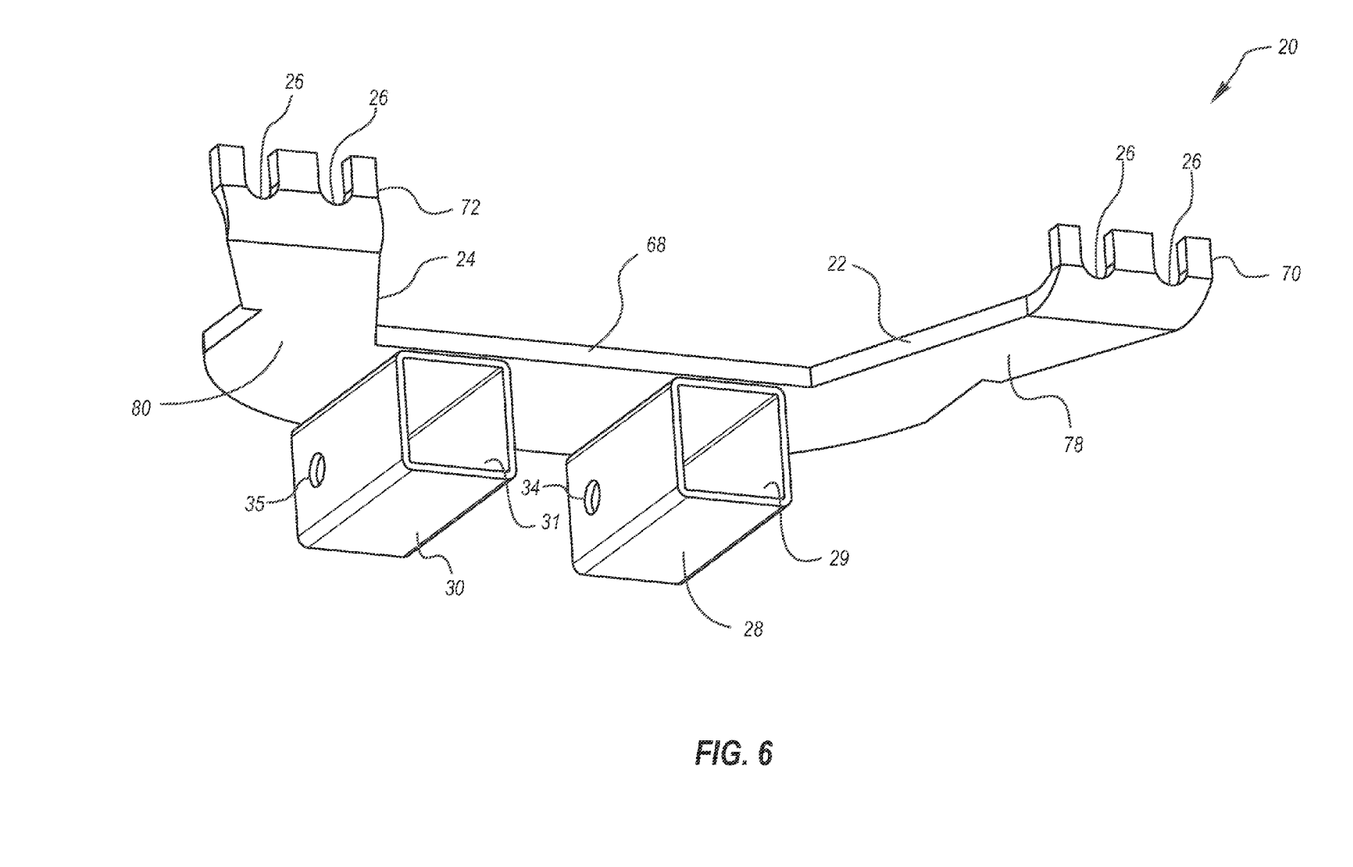
FIG. 6 is a bottom rear perspective view of an implementation of a first vehicle coupler.

In implementations a first vehicle coupler 20 of the carrying device 2 is configured to couple to one or more other elements of the carrying device 2 and to further couple to a vehicle. Referring to FIGS. 5 and 6, in implementations the first vehicle coupler 20 has a base 68 having a largest planar surface 76 of the first vehicle coupler 20. A first attachment member 22 and a second attachment member 24 are each attached to the base 68. The first attachment member 22 includes a vertical section 70 that has, therein, a plurality of recesses that form vertical slots that are bolt receivers 26. The bolt receivers 26 are configured to each receive a bolt such as to allow the first vehicle coupler 20 to be coupled to a vehicle. In implementations the vertical section 70 is substantially perpendicular to the largest planar surface 76 of the base 68. In implementations the first attachment member 22 could exclude the vertical section 70 and/or could otherwise include only one bolt receiver 26, or more than two bolt receivers 26, and the like.

In implementations the first vehicle coupler 20 includes a second attachment member 24 similar to the first attachment member 22 and having a vertical section 72 having at least one bolt receiver 26 that, similar to the bolt receivers 26 of the first attachment member 22, is formed by vertical slots in the second vertical section 72. In implementations the slots could be horizontal slots, or the bolt receivers 26 could be slots or circular openings that are entirely contained within the first attachment member 22 or second attachment member 24, or the like. In implementations the first attachment member 22 has a largest planar surface 78 that is in the same plane, or substantially in the same plane, as the largest planar surface 76. In implementations the second attachment member 24 has a largest planar surface 80 that is in the same plane, or substantially the same plane, as the largest planar surface 76. In implementations the vertical section 70 and vertical section 72 are in the same plane or are substantially in the same plane. In implementations the first attachment member 22 forms a greater than ninety-degree angle with the base 68. In implementations the second attachment member 24 forms a greater than ninety-degree angle with the base 68. In implementations the first attachment member 22 forms an angle of about one hundred twenty degrees with the base 68. In implementations the second attachment member 24 forms an angle of about one hundred twenty degrees with the base 68.

In implementations the vehicle is a motorcycle, though in other implementations the vehicle could be any other type of vehicle such as, by non-limiting example: a bicycle, a car, a bus, a street motorcycle, an off-road motorcycle, a dual-purpose motorcycle; a cruiser motorcycle; a sportbike motorcycle; a scooter; a moped; a dune buggy; a sandrail; a truck; a van; an SUV; a bus; and the like. Accordingly, the first vehicle coupler 20 in implementations may be configured to couple to any of the above types of vehicles.

Referring still to FIGS. 5 and 6, in implementations the first vehicle coupler 20 includes a first receiver 28 having a first substantially rectangular cuboidal cavity 29 accessible through a first substantially rectangular opening 32 and a second receiver 30 having a second substantially rectangular cuboidal cavity 31 accessible through a second substantially rectangular opening 33. The first receiver 28 and second receiver 30 are thus both configured to receive a substantially rectangular cuboid-shaped item. In implementations the substantially rectangular cuboid-shaped item could include a hole for the reception of a pin 92 and, accordingly, the first receiver 28 includes a first pin receiver 34 to align with one or more holes in the substantially rectangular cuboid-shaped item such that a pin 92 may be inserted into the hole(s) in the substantially rectangular cuboid-shaped item through the first pin receiver 34 to at least temporarily lock the substantially rectangular cuboid-shaped item into place. The second receiver 30 similarly includes a second pin receiver 35 for similar purposes.

In implementations the first receiver 28 and second receiver 30 have equal, or substantially equal, dimensions. In implementations the first substantially rectangular opening 32 and second substantially rectangular opening 33 are in the same, or substantially the same, plane. In implementations the first receiver 28 and second receiver 30 are aligned parallel, or substantially parallel, to one another. Referring to FIG. 6, in implementations the first substantially rectangular cuboidal cavity 29 of the first receiver 28 is accessible from a side or rear of the first receiver 28 opposite the first substantially rectangular opening 32, and in implementations the second substantially rectangular cuboidal cavity 31 of the second receiver 30 is accessible from a side or rear of the second receiver 30 opposite the second substantially rectangular opening 33.

Figure 3:
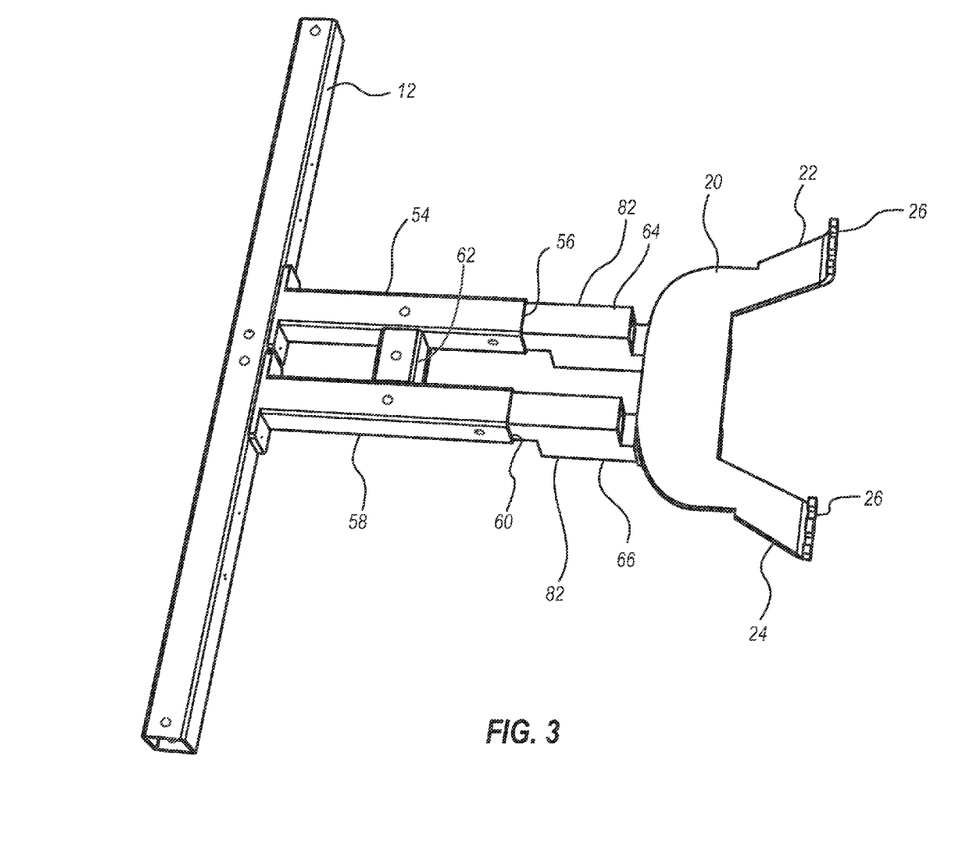
FIG. 3 is a top perspective view of a first vehicle coupler, a first height adjuster, a second height adjuster, a first connector, a second connector, a bridge, and a main floor member of an implementation of a carrying device.
Figure 4:
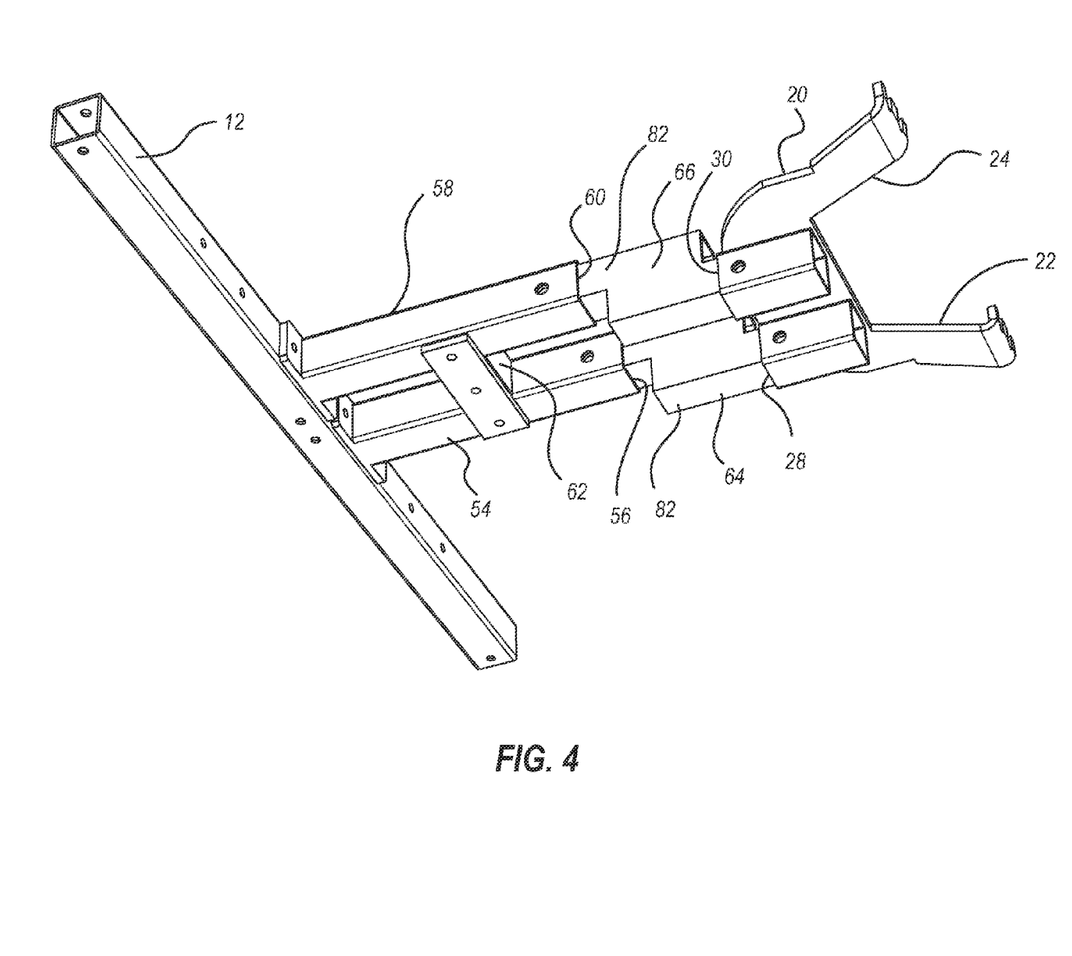
FIG. 4 is a bottom perspective view of a first vehicle coupler, a first height adjuster, a second height adjuster, a first connector, a second connector, a bridge, and a main floor member of an implementation of a carrying device.

Referring to FIGS. 3 and 4, in implementations the first vehicle coupler 20 is configured to couple to the first connector 54 and second connector 58. In implementations the first vehicle coupler 20 may be configured to attach directly to the first connector 54 and second connector 58. In implementations the first connector 54 includes a third receiver 56 that includes a third substantially rectangular cuboidal cavity and the second connector 58 includes a fourth receiver 60 that includes a fourth substantially rectangular cuboidal cavity. In implementations one or more intermediary connectors 82 couples the first vehicle coupler 20 and at least one of the first connector 54 and the second connector 58. In implementations each intermediary connector 82 includes one or more substantially rectangular cuboidal portions and is configured to couple to both the first vehicle coupler 20 and at least one of the first connector 54 and the second connector 58.

In various implementations a first intermediary connector 82 includes a height adjuster, for example in implementations a first height adjuster 64 includes a substantially rectangular cuboid-shaped element that inserts into the first substantially rectangular cuboidal cavity 29 of the first receiver 28 and a substantially rectangular cuboid-shaped element that inserts into the third substantially rectangular cuboidal cavity of the first connector 54. In implementations a second height adjuster 66 includes a substantially rectangular cuboid-shaped element that inserts into the second substantially rectangular cuboidal cavity 31 of the second receiver 30 and a substantially rectangular cuboid-shaped element that inserts into the fourth substantially rectangular cuboidal cavity of the second connector 58. In implementations the first height adjuster 64 and second height adjuster 66 are configured to either increase or decrease the height of the one or more carrying sections 4. In the implementations shown the first height adjuster 64 and second height adjuster 66 are each configured to increase the height of the one or more carrying sections 4. In implementations, however, the first height adjuster 64 and second height adjuster 66 could each be flipped around so that they would be configured to decrease the height of the one or more carrying sections 4.

Referring to FIG. 2, in particular implementations the carrying device 2 includes a second vehicle coupler 36 that is configured to couple to the one or more carrying sections 4 and that is further configured to couple to the vehicle. In implementations the second vehicle coupler 36 includes a pair of arms 38 that are coupled to the one or more carrying sections 4 through a pivot 46. In the implementations illustrated, the pair of arms 38 is coupled to the vertical support 16 through the pivot 46. In implementations each arm 38 is movable through the pivot 46 and the arms 38 are configured to couple to the vehicle and form a v-shape. In implementations an attachment end 40 of each arm 38 includes a clamp 44. In implementations the carrying device 2 could exclude a second vehicle coupler 36. In implementations the second vehicle coupler 36 could be some element other than the arms 38 coupled to one or more carrying sections 4 through a pivot 46. By non-limiting example, in implementations the second vehicle coupler 36 could be a single arm 38 coupled to one or more of the carrying sections 4 with or without a pivot 46.

In implementations one or more or all of the implementing components of a carrying device 2 are formed of hollow tubing, such as hollow metallic tubing having a circular, square, rectangular, or other closed shape cross-sectional shape. In implementations the first receiver 28, second receiver 30, first height adjuster 64, second height adjuster 66, first connector 54, second connector 58, main floor member 12, side floor members 14, vertical support 16 and lateral support 18 are formed of hollow rectangular tubing, such as metallic hollow rectangular tubing, with flanges and/or holes used to connect the separate pieces, such as with screws and/or bolts or the like, though in implementations one or more or all of these elements could be welded or otherwise formed together. In implementations each clamp 44 is coupled to an arm 38 through an opening in the attachment end 40 of the arm 38.

In implementations the vertical members 8 and lateral members 10 may be coupled together such as with screws, bolts, or the like. In implementations these elements could be welded or otherwise permanently joined together. In implementations the arms 38 are rigid elements. In implementations the accessory mount 48 may be excluded.

In implementations the first vehicle coupler 20 could include other configurations. By non-limiting example, in implementations the first vehicle coupler 20 could include only a first attachment member 22 or only a second attachment member 24, instead of both, and/or could include something other than a bolt receiver 26, such as a clamp, a hook, or any other connecting type of mechanism.

Referring now to FIGS. 1 and 7, in various implementations an accessory mount 48 includes a first section 49 and a second section 51 which are separable from one another and allow the accessory mount 48 to be separable into two components. As shown in FIG. 1, the portion of the accessory mount 48 to which a license plate or other item may be coupled using the openings 50 may be entirely contained on the first section 49 (or, in other implementations, on the second section 51) so that the license plate is directly coupled only to one side of the accessory mount 48. This may allow the carrying device 2 to be opened, as shown in FIG. 7, without requiring a user to remove the license plate or other item attached to the accessory mount 48 through the openings 50. In other implementations the accessory mount 48 does not include a first section 49 and second section 51 and/or is not otherwise separable in the manner described.

Referring to FIG. 7, in implementations the opening and closing of a carrying device 2 may be implemented, by non-limiting example, using hinges 84 and latches 86. In the implementations shown in FIG. 7 each carrying section 4 includes hinges 84 and latches 86 to open up individually. In other implementations only one carrying section 4 may include one or more hinges 84, and only the other carrying section 4 may include one or more latches 86, so that by unlatching and swinging open one carrying section 4 the other carrying section 4 necessarily opens thereby as well. In such an implementation the back portions of each carrying section 4 would be fixed relative to one another (such as using the vertical support 16 and lateral support 18) and the front portions of each carrying section 4 would also be fixed relative to one another such as through the accessory mount 48 and other mechanisms or attachment devices. In implementations the back portions of the carrying sections 4 may be molded or otherwise integrally formed together while the front portions of the carrying sections 4 may also be molded or otherwise integrally formed together.

Referring still to FIG. 7, in implementations a carrying device 2 may include a restraint 94 configured to fully or partially restrain an item placed in the carrying device 2 when the carrying device 2 is in a closed configuration. By non-limiting example, in implementations the restraint 94 may be formed of a compressible foam that is tailored to press upon an item (such as a golf bag) when the carrying device 2 is closed, so that the item will be held in place and not move about during transportation of the item. In implementations the thickness of such a compressible foam could be altered according to the desired end use. In implementations there may be multiple restraints 94 used, such as one at the top of each carrying section 4, as shown, and one at the middle and/or towards the bottom of each carrying section 4, and so forth.

Figure 8:
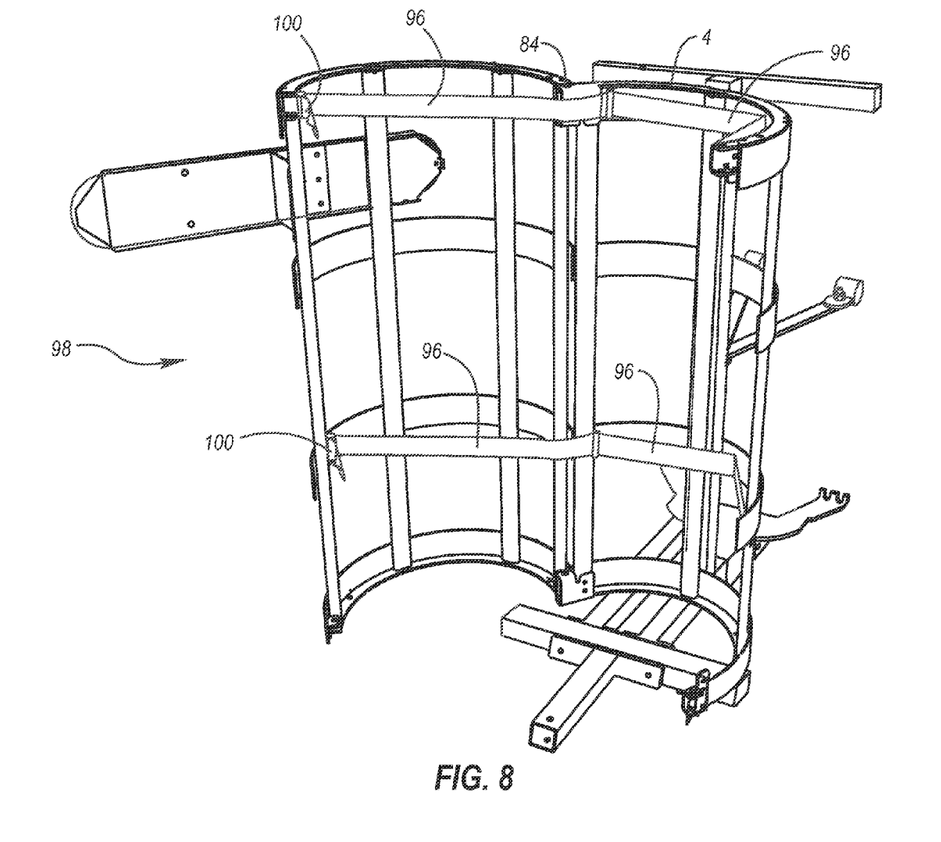
FIG. 8 is a front perspective view of an implementation of a carrying device in an open configuration.
Figure 9:
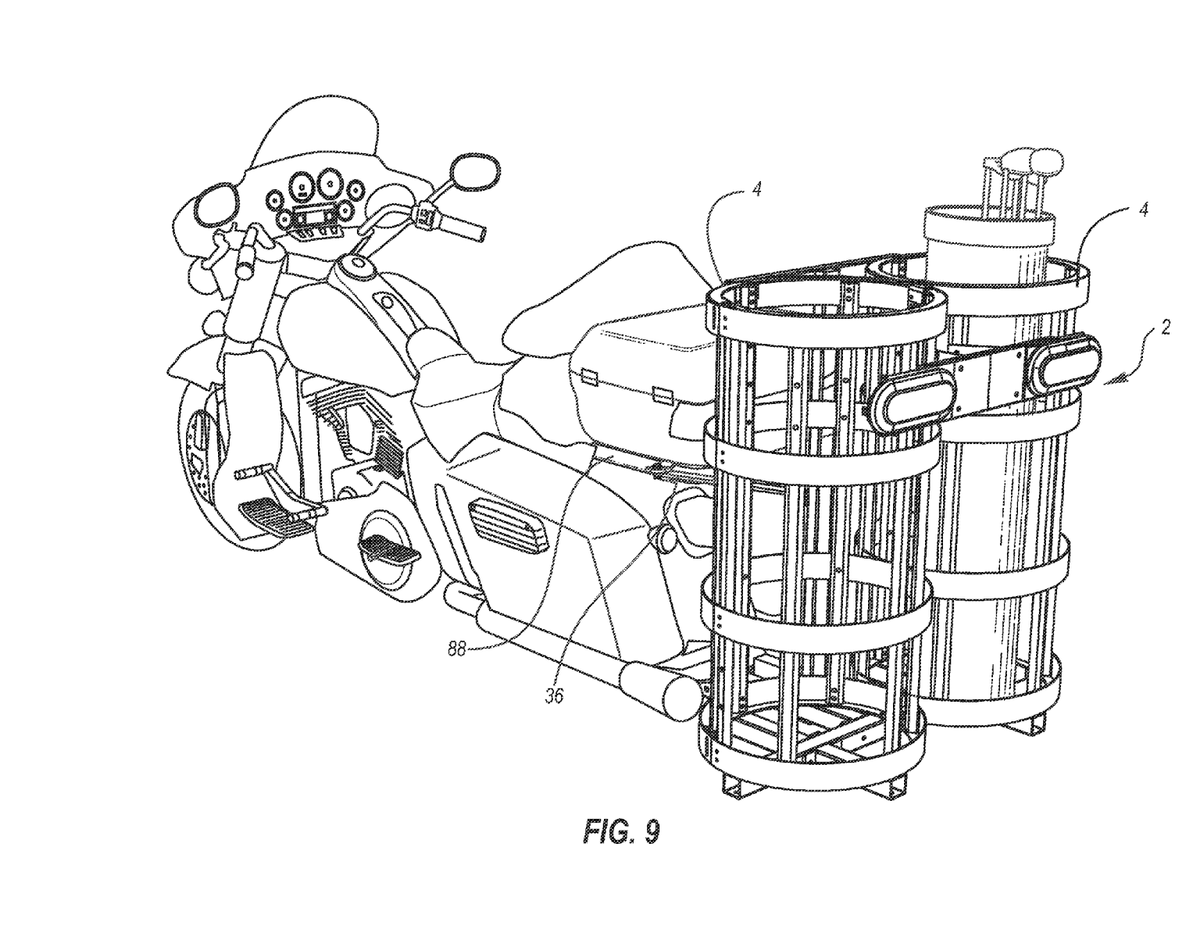
FIG. 9 is rear perspective view of an implementation of a carrying device attached to a motorcycle.

Referring to FIG. 8, in implementations a carrying device 98 is similar in many ways to a carrying device 2 but is different at least in that it only has a single carrying section 4 instead of two carrying sections 4. A restraint 96 is shown in FIG. 9, which restraint 96 could be included on carrying device 2 as well. In implementations the restraint 96 includes a belt, the length of which may be adjusted using the adjuster 100. In implementations the belt may be biased towards a closed position or, in other words, towards a smaller-diameter configuration so that it automatically tightens around the item to be carried as the carrying section 4 is closed. In implementations there may be multiple restraints 96 at multiple locations, as shown in FIG. 8, though in other implementations only a single restraint 96 could be used. In implementations a carrying device 98 could utilize one or more restraints 94 instead of one or more restraints 96, and in other implementations a carrying device 2 and/or a carrying device 98 could each include both one or more restraints 94 and one or more restraints 96. In implementations the adjuster 100 could include a cinching mechanism such as a double ring or double D-ring belt, a ratcheting mechanism, hook-and-loop fasteners, or some other tightening mechanism.

In implementations the carrying device 2 could include only a single carrying section 4 and could open in like manner as each carrying section 4 is shown opening in FIG. 7. In such an implementation the main floor member 12 could be shortened, for example, and the single carrying section 4 could be in a central position, i.e., lined up with the first vehicle coupler 20 and second vehicle coupler 36, and the vertical support 16 and/or lateral support 18 in such an implementation may or may not be included, and other components may remain the same or similar to those shown in the drawings, with some attachment points of portions of the carrying device 2 altered. In implementations one or more of the lateral members 10 may be formed of a flexible or semi-flexible material such that one or more of the lateral members 10 may effectively form a living hinge by flexing upon opening of the carrying section 4. In implementations the use of living hinges may serve to keep the carrying section 4 more rigid.

Figure 10:
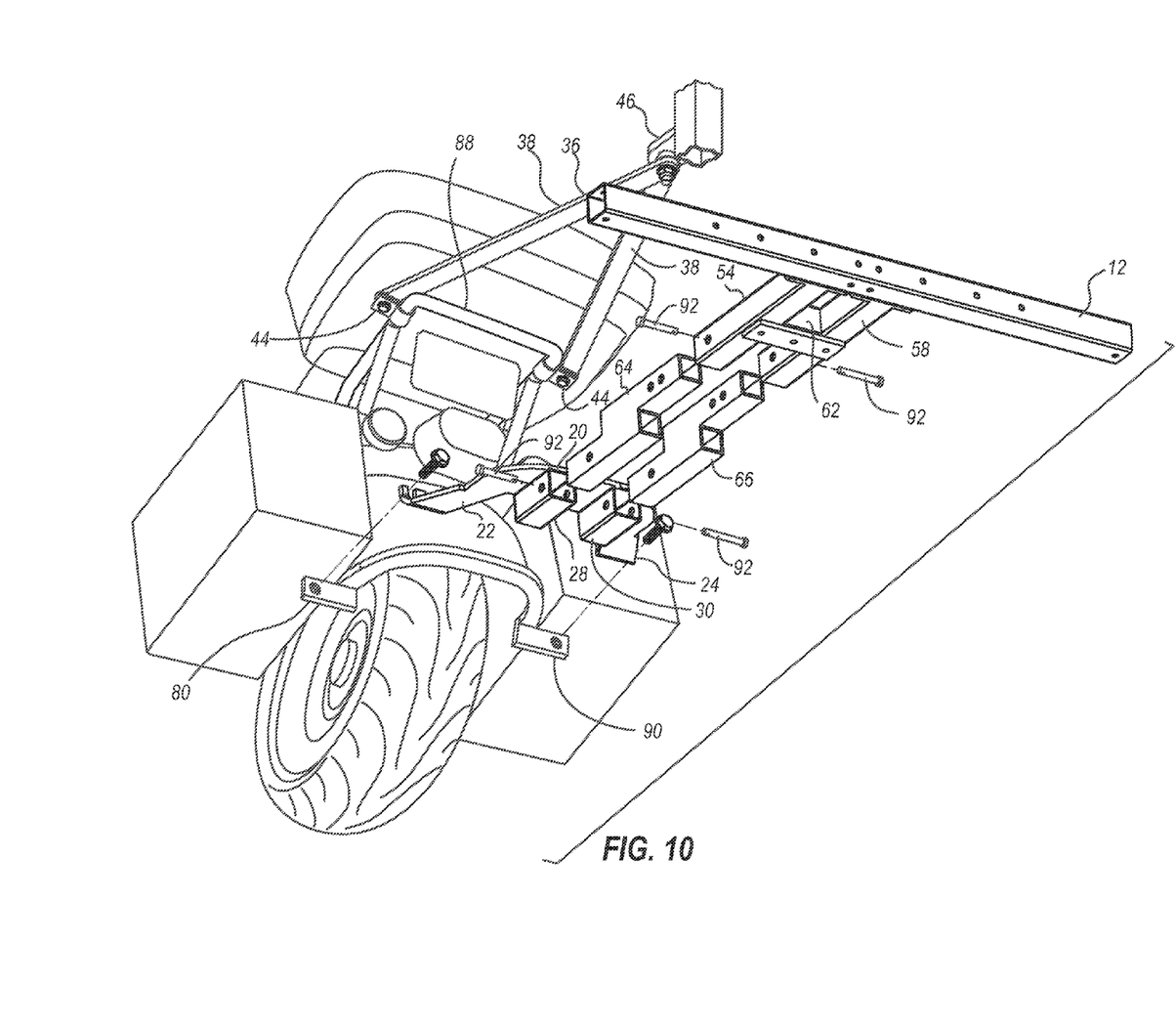
FIG. 10 is an exploded rear-bottom perspective view of the rear portion of a motorcycle and several components of an implementation of a carrying device to be coupled thereto.

Referring to FIGS. 9 and 10, in implementations the carrying device 2 may be attached to the rear portion of a motorcycle. For example, in implementations a bar 88 at or towards the rear of the motorcycle may be used as an attachment point for the clamp 44 of the second vehicle coupler 36 and one or more attachment members 90 proximate the rear wheel of the motorcycle may be used as attachment points for the first vehicle coupler 20. In implementations the attachment members 90 may be a part of the motorcycle to begin with though in other implementations they could be added later, and in any case may be attached to a wheel cover or mud flap or other component. In implementations the bar 88 may be a part of the motorcycle to begin with though in other implementations it could be added later. In implementations the bar 88 could be used to hold another compartment, or to hold (or serve as support for) a passenger seat, or the like, and/or may have another purpose as its primary purpose in addition to serving as an attachment point for the second vehicle coupler 36. Although discussion is made herein specifically in relation to a motorcycle, it is to be understood that the same may apply to a bicycle, a car, a bus, a street motorcycle, an off-road motorcycle, a dual-purpose motorcycle; a cruiser motorcycle; a sportbike motorcycle; a scooter; a moped; a dune buggy; a sandrail; a truck; a van; an SUV; a bus; and the like.

In implementations the carrying device 2 may have one or more components on the bottom to prevent scratching and other damage to the carrying device 2 and/or to prevent the carrying device 2 from scratching or damaging other items. In implementations, this may include polymer or rubber feet or the like located on the bottom of the carrying device 2. Referring to FIG. 10, in implementations a plurality of pins 92 may be used to hold components of the carrying device 2 together and, conversely, may be removed for disassembly of the carrying device 2 or for separating portions of the carrying device 2 from one another, such as separating a carrying section 4 from the first vehicle coupler 20, or the like.

In places where the description above refers to particular implementations of carrying devices and related methods and implementing components, sub-components, methods and sub-methods, it should be readily apparent that a number of modifications may be made without departing from the spirit thereof and that these implementations, implementing components, sub-components, methods and sub-methods may be applied to other carrying devices and related methods.

What is claimed is:

1. A first vehicle coupler configured for attachment to a motorcycle, comprising:
   a first attachment member coupled to a base and comprising at least one bolt receiver;
   a second attachment member coupled to the base and comprising at least one bolt receiver;
   a first receiver coupled to the base and defining a first substantially rectangular cuboidal cavity, the first receiver having a first substantially rectangular opening providing access to the first substantially rectangular cuboidal cavity; and
   a second receiver coupled to the base and defining a second substantially rectangular cuboidal cavity, the second receiver comprising a second substantially rectangular opening providing access to the second substantially rectangular cuboidal cavity, wherein the first substantially rectangular cuboidal cavity and the second substantially rectangular cuboidal cavity have substantially equal dimensions, wherein the first substantially rectangular opening and second substantially rectangular opening are substantially comprised in the same plane and face substantially the same direction.

2. The first vehicle coupler of claim 1, wherein the at least one bolt receiver of the first attachment member is comprised in a vertical section of the first attachment member that is substantially perpendicular to a largest planar surface of the base, and wherein the at least one bolt receiver of the second attachment member is comprised in a vertical section of the second attachment member that is substantially perpendicular to the largest planar surface of the base.

3. The first vehicle coupler of claim 1, wherein each of the at least one bolt receiver of the first attachment member and second attachment member comprises a recess forming a vertical slot.

4. The first vehicle coupler of claim 1, wherein the vertical section of the first attachment member and the vertical section of the second attachment member are each substantially parallel with, and substantially comprised in, the same plane.

5. The first vehicle coupler of claim 1, wherein the first receiver comprises a first pin receiver and wherein the second receiver comprises a second pin receiver.

6. A carrying device for attachment to a vehicle, comprising:
   at least one carrying section configured to receive the full diameter and at least more than half of the length of a golf bag, the at least one carrying section comprising an opening at its upper extremity configured to allow the golf bag to enter into the at least one carrying section, wherein the at least one carrying section comprises a plurality of sidewall openings therethrough configured to visually expose the golf bag through the plurality of sidewall openings more than to visually enclose the golf bag through the at least one carrying section;
   a first vehicle coupler configured to be coupled to the vehicle, the first vehicle coupler further comprising a first receiver having a first substantially rectangular cuboidal cavity and a second receiver having a second substantially rectangular cuboidal cavity, the first receiver comprising a first substantially rectangular opening providing access to the first substantially rectangular cuboidal cavity and the second receiver comprising a second substantially rectangular opening providing access to the second substantially rectangular cuboidal cavity, wherein the first substantially rectangular opening and second substantially rectangular opening are substantially comprised in the same plane and face substantially the same direction;
   a first connector coupled to the at least one carrying section, the first connector coupled to the first vehicle coupler through the first substantially rectangular cuboidal cavity of the first receiver, and;
   a second connector coupled to the at least one carrying section, the second connector coupled to the first vehicle coupler through the second substantially rectangular cuboidal cavity of the second receiver.

7. The carrying device of claim 6, wherein the first connector comprises a third receiver comprising a third substantially rectangular cuboidal cavity and the second connector comprises a fourth receiver comprising a fourth substantially rectangular cuboidal cavity, and wherein a first height adjuster couples to the first connector through the third substantially rectangular cuboidal cavity and couples to the first vehicle coupler through the first substantially rectangular cuboidal cavity, and wherein a second height adjuster couples to the second connector through the fourth substantially rectangular cuboidal cavity and couples to the first vehicle coupler through the second substantially rectangular cuboidal cavity.

8. The carrying device of claim 6, wherein the first vehicle coupler comprises a first attachment member and a second attachment member, the first attachment member and the second attachment member each having at least one bolt receiver configured to allow the first vehicle coupler to be coupled to the vehicle.

9. The carrying device of claim 6, wherein the at least one carrying section comprises a framework of vertical members and lateral members and at least one floor member coupled together and forming the plurality of sidewall openings.

10. The carrying device of claim 6, wherein an overall shape of the at least one carrying section is cylindrical.

11. The carrying device of claim 6, further comprising one or more hinges disposed along a longest length of the at least one carrying section and configured to allow the at least one carrying section to be opened along the longest length.

12. The carrying device of claim 6, wherein the at least one carrying section comprises two carrying sections.

13. The carrying device of claim 12, wherein each carrying section comprises at least one hinge disposed along a longest length of the carrying section and configured to allow the carrying section to open along the longest length.

14. The carrying device of claim 6, further comprising a restraint coupled to the carrying device and configured to restrain a movement of an item placed in the carrying device.

15. The carrying device of claim 6, further comprising at least one height adjuster coupled between the first vehicle coupler and the at least one carrying section and configured to adjust a height of the at least one carrying section.

16. The carrying device of claim 6, further comprising a second vehicle coupler coupled to the at least one carrying section and configured to couple to the vehicle.

17. The carrying device of claim 16, wherein the second vehicle coupler comprises a pair of rigid arms coupled to the at least one carrying section through a pivot.

\* \* \* \* \*